(12) United States Patent
Avitsur et al.

(10) Patent No.: US 6,201,854 B1
(45) Date of Patent: Mar. 13, 2001

(54) SYSTEM AND METHOD FOR TELEPHONE NUMBER VERIFICATION AND IDENTIFICATION

(75) Inventors: Yair Avitsur, Ranana; Yosef Yahav, Kfar-Saba, both of (IL)

(73) Assignee: Y.P. Unitesters Ltd., Hud Hasharon (IL)

(*) Notice: Subject to any disclaimer, the term of this patent is extended or adjusted under 35 U.S.C. 154(b) by 0 days.

(21) Appl. No.: 09/200,720

(22) Filed: Nov. 27, 1998

(51) Int. Cl.[7] .............................. H04M 1/24; H04M 3/08; H04M 3/22

(52) U.S. Cl. .............................. 379/27; 379/29; 379/32; 379/257; 379/277; 379/381; 379/386

(58) Field of Search .................... 379/1, 27, 29, 379/2, 92.01, 92.02, 92.03, 386, 257, 277, 293, 297, 381

(56) References Cited

U.S. PATENT DOCUMENTS

| | | | |
|---|---|---|---|
| 4,554,418 | * 11/1985 | Toy | 379/92.01 |
| 5,414,754 | * 9/1995 | Pugh et al. | 379/67.1 |
| 5,636,267 | * 6/1997 | Utsumi et la. | 379/382 |
| 5,661,791 | * 8/1997 | Parker | 379/211 |
| 5,699,402 | * 12/1997 | Bauer et al. | 379/26 |
| 5,799,060 | * 8/1998 | Kennedy et al. | 379/29 |
| 6,078,646 | * 6/2000 | McLaughlin et al. | 379/27 |

* cited by examiner

*Primary Examiner*—Duc Nguyen
(74) *Attorney, Agent, or Firm*—Mark M. Friedman

(57) ABSTRACT

A testing environment and a method for telephone number identification and/or verification. The testing environment and method of the present invention analyzes incoming analog signals of a telephone call being made to the tested line as the receiving party from the central office switch. These incoming analog signals preferably include ring signal, waiting call tone and voice signals. The incoming analog signals are analyzed and processed by the testing unit according to the present invention in order to identify and/or verify the telephone number. Thus, the testing environment and method of the present invention has the advantage of being able to analyze data received from the tested line as the receiving party, rather than requiring the tested telephone line to initiate the telephone call for testing purposes.

6 Claims, 2 Drawing Sheets

Testing Environment

SYSTEM AND METHOD FOR TELEPHONE NUMBER VERIFICATION AND IDENTIFICATION

FIELD AND BACKGROUND OF THE INVENTION

The present invention relates to a testing system and a method for telephone number verification/identification in a local telephony network, and in particular, to a testing system and method which is substantially automatic and yet which is also flexible and reliable, and which permits verification and/or identification of telephone numbers while updating database information or while maintaining the database for local telephony network.

Telephone number verification and/or identification is a well known process. Currently available equipment relies upon the caller identification process. This process is a service according to which a telephone central office switch sends digital information about the incoming telephone call to the party being called. This digital information includes the telephone number of the party originating the telephone call. The caller identification testing and transmitting feature is provided by most, but not all, telephone central office switches. Telephone products with caller identification require special hardware, firmware and software to adapt the products to the relevant physical and data-link layers. ISDN lines and interfaces are equipped with this capability, for example.

In order to perform the verification and/or identification for updating or maintaining the database, for example, special test equipment must be connected parallel to the tested telephone line, which is usually a "live" or fully connected and functioning, telephone line. Telephone number verification/identification by using the caller identification feature usually involves initiating a telephone call from the tested line, if possible, to a known and dedicated telephone and telephone line. The special test equipment then intercepts the digital information, including the telephone number of the tested line.

Unfortunately, this method has a number of limitations. For example, the testing equipment cannot initiate a telephone call from the tested telephone line if the tested line is busy. Similarly, the testing process cannot be performed if the user is dialing the telephone or otherwise interfering with the process. For telephone lines which only permit incoming telephone calls, no telephone call can be initiated in order to perform the test. The special test equipment cannot initiate a telephone call while being connected to the lines which are connected to non-direct lines (ISDN and PCM lines, for example). In addition, some telephone central office switches do not have the caller identification feature which enables the process to be performed.

Even when the caller identification process can be performed for testing of the telephone line, this process has the drawback of requiring at least seven to eight seconds to perform, which is the combination of the time required to dial the telephone number on the tested line and to receive the caller identification information at the party receiving the telephone call.

A preferable method and testing system for automatic telephone verification and/or identification would use standard features of any digital or analog telecommunications switch, and would not have the drawbacks of the known caller identification process. Unfortunately, such a testing system and method are not currently available.

Therefore, there is an unmet need for, and it would be highly useful to have, a testing system and a method for performing telephone verification and/or identification with standard features of any digital telecommunications switch, which does not have the limitations of the currently known process, and which is reliable and efficient.

SUMMARY OF THE INVENTION

The present invention is of a testing environment and a method for telephone number identification and/or verification. The testing environment and method of the present invention analyzes incoming analog signals of a telephone call being made to the tested line as the receiving party from the central office switch. These incoming analog signals preferably include ring signal, waiting call tone and voice signals. The incoming analog signals are analyzed and processed by the testing unit according to the present invention in order to identify and/or verify the telephone number. Thus, the testing environment and method of the present invention has the advantage of being able to automatically analyze analog signals received from the tested line as the receiving party, rather than requiring the tested telephone line to initiate the telephone call for testing purposes.

According to the present invention, there is provided a method for identifying and/or verifying a telephone number associated with a tested telephone line, the method comprising the steps of: (a) connecting to the tested telephone line; (b) dialing the telephone number associated with the tested telephone line; (c) analyzing a received tone received from the tested telephone line; and (d) if the received tone is a ringing type signal, verifying the telephone number.

According to another embodiment of the present invention, there is provided a testing environment for identifying and verifying a telephone number associated with a tested telephone line, the testing environment comprising: (a) a central office switch for transmitting analog signals to the tested telephone line; (b) a tap for connecting to the tested telephone line for receiving analog signals from the tested telephone line; (c) a sensing unit for sensing the analog signals to obtain sensed signals; (d) an A/D conversion and processing unit for converting the sensed signals to digital data; and (e) a MMI and processing unit for determining if the digital data features a ringing type signal, such that if the digital data features the ringing type signal, the telephone number is verified.

Hereinafter, the term "man-machine interface and processing unit" refers to a particular computer hardware system or to a particular software operating system. Examples of such hardware systems include, but are not limited to, personal computers (PC), palmtop computers, handheld and portable computers, Macintosh™ computers, mainframes, minicomputers and workstations. Examples of such software operating systems include, but are not limited to, UNIX, VMS, Linux, MacOS™, DOS, one of the Windows™ operating systems by Microsoft Inc. (Seattle, Wash., USA), including Windows NT™, Windows 3.x™ (in which "x" is a version number, such as "Windows 3.1™"), Windows CE™, Windows95™, and Windows98™, as well as any suitable operating system for embedded units or palmtop/handheld type portable computers.

For the present invention, a software application could be written in substantially any suitable programming language, which could easily be selected by one of ordinary skill in the art. The programming language chosen should be compatible with the man-machine interface and processing unit according to which the software application is executed. Examples of suitable programming languages include, but are not limited to, C, C++ and Java.

In addition, the present invention could be implemented as software, firmware or hardware, or as a combination thereof. For any of these implementations, the functional steps performed by the method could be described as a plurality of instructions performed by a data processor.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a testing environment and a method for telephone number identification and/or verification. The testing environment and method of the present invention analyzes incoming analog signals of a telephone call being made to the tested line as the receiving party from the central office switch. These incoming analog signals preferably include, but are not limited to, ring signal, ringing signature, waiting call tone and voice signals, or any other incoming analog signal being received from the central switch. The incoming analog signals are analyzed and processed by the testing unit according to the present invention in order to identify and/or verify the telephone number. Thus, the testing environment and method of the present invention has the advantage of being able to analyze data obtained from analog signals received from the tested telephone line as the receiving party, rather than requiring the tested telephone line to initiate the telephone call for testing purposes.

The principles and operation of the testing environment and method according to the present invention may be better understood with reference to the drawings and the accompanying description.

Figure 1:
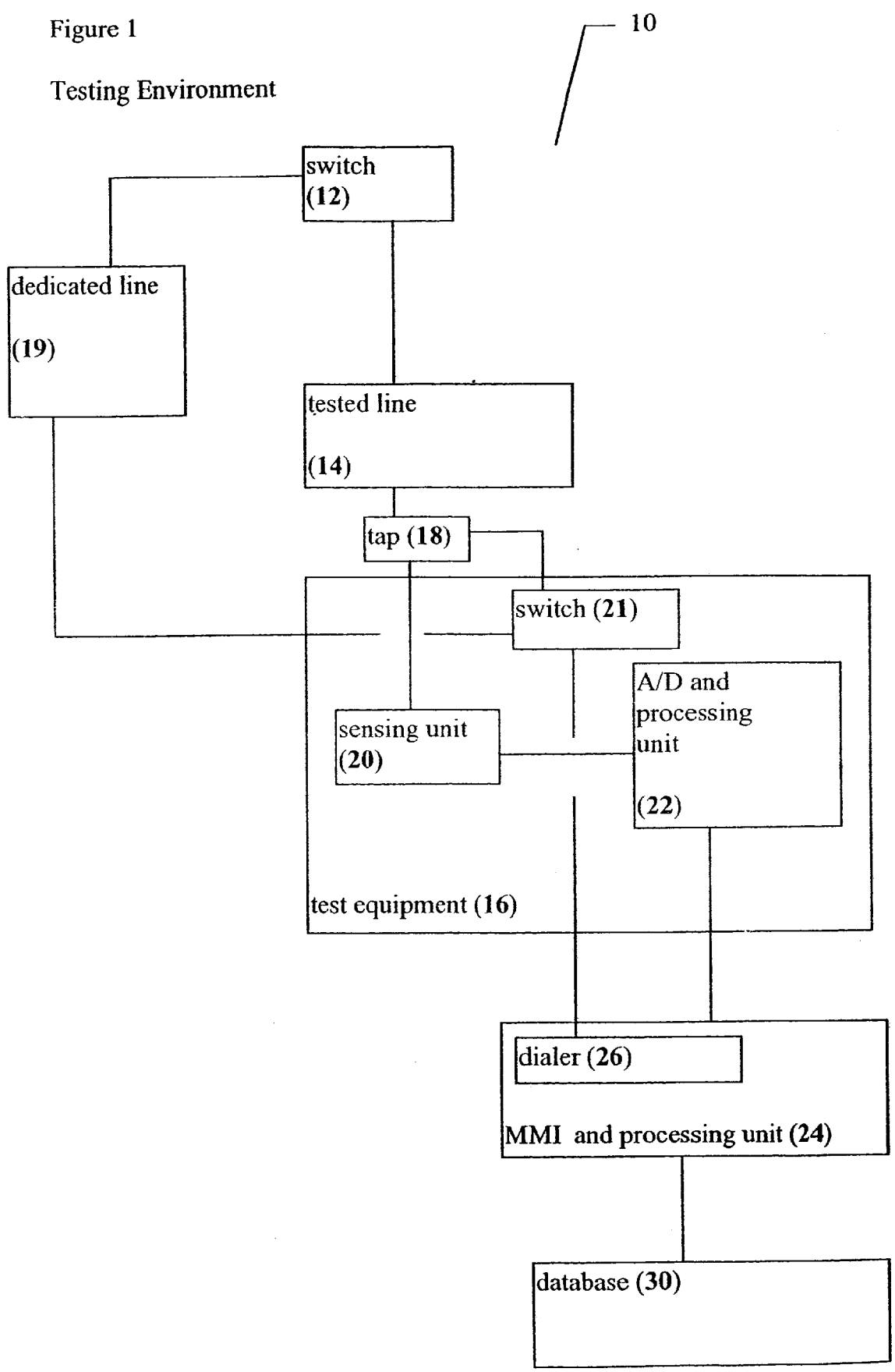
FIG. 1 is a schematic block diagram illustrating an exemplary testing environment according to the present invention.

Referring now to the drawings, FIG. 1 is a schematic block diagram illustrating an exemplary testing environment according to the present invention. A testing environment 10 includes a number of different components which are involved in the testing process, such as a telephone company central switch 12 which is connected to a tested telephone line 14 on which the method of the present invention is performed to identify and/or verify the telephone number assigned to tested telephone line 14. A test equipment 16 is also connected to tested telephone line 14, for the purposes of identifying and/or verifying the telephone number. Test equipment 16 performs the method of the present invention on tested telephone line 14. Test equipment 16 optionally is implemented as hardware, firmware, or a combination of either type of component with software.

According to one embodiment, telephone company central switch 12 initiates the telephone call to tested telephone line 14. Preferably, however, test equipment 16 is able to initiate the telephone call to tested telephone line 14 from a second auxiliary dedicated telephone line 19 as shown. As described in further detail below, preferably a telephone call can also be initiated from tested telephone line 14, for example in order to receive information on the same tested telephone line 14 from central switch 12.

One preferred implementation of test equipment 16 features a tap 18 connected to tested telephone line 14 for receiving analog signals about the incoming telephone call. Tap 18 is optionally a one-pair tap, but is preferably a five-pair or ten-pair "tap". Each telephone line can be described as a pair since it has a beginning point and an end point. Five-pair or ten-pair taps are preferable since at the cross-connection box, the lines are in blocks of 100 lines, 10 lines in each group. However, the lines are connected in blocks of 50 lines to central switch 12, 5 lines in each group. Therefore, if the method of the present invention is to be performed on such a crossconnection box, the larger number of pairs in the tap is preferable.

Tap 18 taps the analog signals passing through tested telephone line 14 and passes the analog signals to sensing unit 20. Sensing unit 20 is hardware which receives the analog signal. The analog signals are then converted to digital data by an A/D conversion and processing unit 22. Preferably, A/D conversion and processing unit 22 also performs preprocessing of the digital data, for example in order to obtain more reliable data.

The converted digital data is then passed to a MMI and processing unit 24 for further analysis. MMI and processing unit 24 is able to analyze the digital data and to perform the method of the present invention with one or more software modules, as described in greater detail below with regard to FIG. 2. Sensing unit 20 and A/D conversion and processing unit 22 are preferably incorporated into a single physical unit, even though both sensing unit 20 and A/D conversion and processing unit 22 are functionally distinct components of test equipment 16. Furthermore, optionally and preferably, MMI and processing unit 24 is also incorporated as a single physical unit with test equipment 16.

MMI and processing unit 24 is preferably a palmtop or handheld portable computer which features a display device for displaying data to a user and which features an input device for entering data and/or instructions. The display device could be a monitor or an LCD display for example. Such an input device could be a mouse or other pointing device, and/or a keyboard or other external data entry device. The input device could also be a touch-sensitive screen, for example. MMI and processing unit 24 includes all necessary components for performing computations such as a CPU, memory, I/O interfaces such as a modem and optionally a permanent, writable storage medium such as a magnetic disk.

Optionally and more preferably, MMI and processing unit 24 includes a dialer 26 for initiating a telephone call from tested telephone line 14 to central switch 12 in order to receive such information as a voice announcement or a caller identification message. More preferably, dialer 26 is connected to a switch 21 within test equipment 16. Switch 21 is connected to both tested telephone line 14 through tap 18 and to dedicated auxiliary telephone line 19. Most preferably, dialer 26 initiates a telephone call to a dedicated telephone number at central switch 12 in order to determine the telephone number associated with tested telephone line 14, for example when the telephone number previously associated with tested telephone line 14 is shown to be different (see FIG. 2 below for more details).

In addition, MMI and processing unit 24 preferably has access to a telephone number database 30 which contains information about the telephone numbers of the telephone lines. As noted previously, MMI and processing unit 24 is optionally, but not necessarily integrated with test equipment 16.

The analog signals which are analyzed by MMI and processing unit 24 optionally include, but are not limited to, the ring signal of tested telephone line 14, the waiting call tone of tested telephone line 14, a ringing signature, any voice announcement which may be automatically generated when tested telephone line 14 receives an incoming telephone call, and the impact of the ringing process on the DC/AC and electrical alterations signature of tested telephone line 14.

Figure 2:
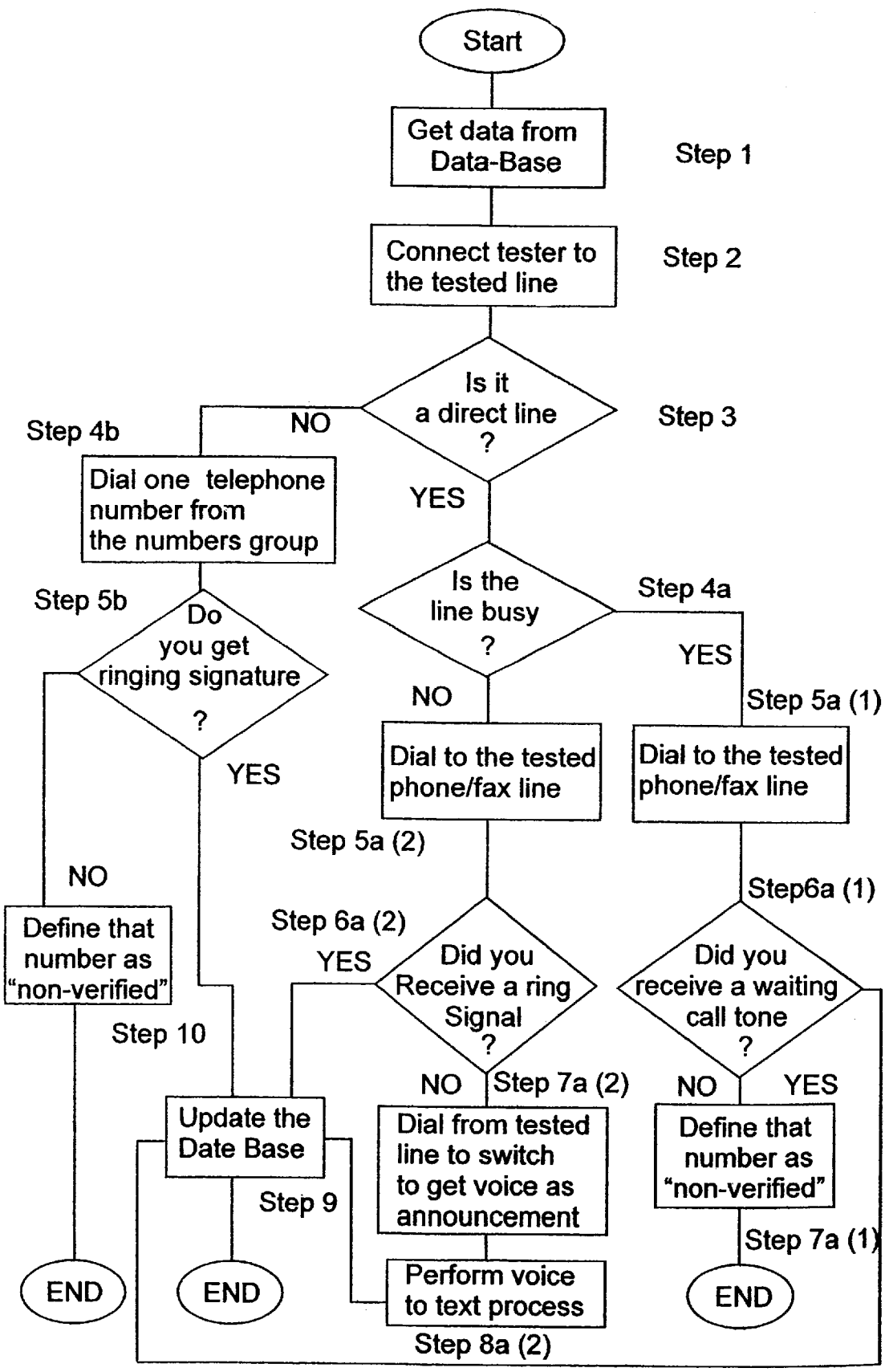
FIG. 2 is a flowchart of an exemplary method according to the present invention.

In order to analyze such data, MMI and processing unit 24 performs the software instructions of the method of the present invention as described with regard to FIG. 2. FIG. 2 is a flowchart of the method of the present invention. At the start of the process, preferably substantially all telephone lines which are "live", or functioning for transmitting or receiving telephone calls, are identified (step not shown in FIG. 2). Such identification is optionally performed according to the voltage of the telephone line, although another type of electrical characteristic could be used for the identification. This permits the process of the present invention to be performed only on "live" telephone lines, which is more efficient since telephone lines which are not in service for transmitting telephone calls should not have assigned telephone numbers.

In step 1, any existing telephone number information is obtained from the database of such information. In step 2, the test equipment is connected to the telephone line to be tested. Such a connection could involve connecting the tap to the telephone line for example. In addition, as noted previously, the test equipment is also optionally and preferably connected to a dedicated auxiliary line for initiating a telephone call to the tested telephone line.

In step 3, the test equipment examines the telephone line to determine the type of telephone line, which is selected from the group consisting of direct and non-direct. Non-direct telephone lines include but are not limited to ISDN, ADSL or PCM lines.

If the telephone line is a direct line, then in step 4a, the test equipment determines whether the tested telephone line is busy. If the tested telephone line is busy, then in step 5a(1) a telephone call is initiated to the tested telephone line by dialing to the tested telephone line according to the expected telephone number which was obtained from the database in step 1. The telephone number is optionally dialed by the test equipment on the auxiliary dedicated line or alternatively by the telephone central office switch. Optionally, the tested telephone line could be dialed according to some other process.

Next, in step 6a(1), the test equipment determines whether a call waiting tone was received when the tested telephone line was dialed. If a call waiting tone was not received, then in step 7a(1) the telephone number is defined as non-verified, and this cycle of the process ends. Preferably, the tested telephone line is tested again if the telephone number is defined as unverified.

If, however, a call waiting tone was received, then the database is updated with the verification of the telephone number of the tested telephone line, in step 9. The call waiting tone is an example of a "ringing type signal" according to the present invention.

Returning now to the branch point of step 4a, if the test equipment alternatively determines that the tested telephone line is not busy, then in step 5a(2), a telephone call is initiated to the tested telephone line by dialing to the tested telephone line according to the expected telephone number which was obtained from the database in step 1. As for step 5a(1), the telephone number is optionally dialed by the test equipment on the auxiliary dedicated line or alternatively by the telephone central office switch, or else is optionally dialed according to some other process.

In step 6a(2), the test equipment determines whether a ring signal was received. The ring signal is another example of a "ringing type signal" according to the present invention. If such a ring signal was received, then in step 9, the database is updated as previously described. Alternatively, if such a ring signal was not received, then in step 7a(2), a telephone call is initiated from the tested telephone line to the telephone central office switch by dialing from the tested telephone line to a dedicated telephone number at the telephone central office switch. Preferably, this telephone call is initiated by the test equipment.

In step 8a(2), the voice announcement is received from the central office switch. Preferably, the voice announcement is converted to text in order to determine the contents of the message. More preferably, the dedicated telephone number at the central office switch which was called from the tested telephone line causes a voice announcement with the telephone number of the tested telephone line to be played. Thus, the telephone number of the tested telephone line is preferably determined from the voice announcement.

In order to obtain the information from the voice announcement, such as the telephone number of the tested telephone line, preferably the voice signals to text conversion was previously performed for substantially all such voice announcements by the central office switch, such that the received voice announcement must simply be compared to previously stored announcements in order to determine the contents of the entirety of the message or at least of a portion of the message. In this case, the telephone company itself could provide the text information for each voice announcement, for example. Alternatively, the voice announcement is converted to text "on the fly", according to voice conversion methods which are well known in the art.

After the contents of the message have been determined according to the converted text, these contents are then stored in the database to update the database for that tested telephone line in step 9. The contents of the message could also optionally include the telephone number of the telephone line itself, in which case the telephone number has been verified, and this information is also stored in the database.

Returning now to the branch point of step 4b, the test equipment has determined that the telephone line is a non-direct line, such that the telephone line is an ISDN, ADSL or PCM line for example, although the method described below would be operable for any type of non-direct line. The reason that a different method is required for the remainder of the steps for these two types of telephone lines is that ISDN, ADSL and PCM lines do not have a single user using a single telephone line, unlike the direct type of telephone line. An ISDN line has two analog channels for performing voice telephone calls and one channel for data transmission and reception. Thus, a single ISDN line has three channels.

PCM and ADSL lines are "mux" or multiplex lines, in which more than one user shares one telephone line. Typically, up to ten end users share a PCM telephone line, each with a different telephone number. Thus, PCM and ADSL telephone lines also do not fit the "one user, one line" model for direct lines, and a different telephone number identification and/or verification method is required.

In step 4b, one telephone number is dialed from the group of two or more of such numbers associated with the tested telephone line. As for the direct telephone line, the telephone number can either be dialed by the test equipment on the auxiliary line or by the telephone central office switch, or optionally according to some other process.

In step 5b, the test equipment determines whether a ringing signature was received. This ringing signature is another example of a "ringing type signal" according to the present invention. The ringing signature is optionally and preferably detected according to changes in the voltage, current or impedance of the tested telephone line, or a combination thereof, such that there is a change in the behavior of the line. Such changes are characteristic of the ringing signature of the ring signal on the tested telephone line.

If the ringing signature was received, then the telephone number is verified and that information is stored in the database in step 9.

Alternatively, if the ringing signature was not received, then in step 10, the telephone number is defined as non-verified, and the process ends.

For the non-direct telephone lines, the steps of the method, which are steps 4b, 5b and 9, or alternatively 4b, 5b and 10 (depending upon the result of step 5b) are preferably performed for each telephone number of the group of telephone numbers which is associated with the tested telephone line.

While the invention has been described with respect to a limited number of embodiments, it will be appreciated that many variations, modifications and other applications of the invention may be made.

What is claimed is:

1. A method for verifying one of a plurality of telephone numbers of one of a plurality of called parties associated with a tested non-direct telephone line, the method comprising the steps of:

(a) connecting to the tested non-direct telephone line;

(b) dialing the one of the plurality of telephone numbers of the one of the plurality of called parties associated with the tested non-direct telephone line;

(c) analyzing a received signal received from the tested non-direct telephone line, wherein said received signal relates to a signal transmitted from a central office switch to the one of the plurality of called parties; and (d) if said received signal is a ringing type signal, verifying the one of the plurality of telephone numbers, wherein said ringing type signal is a ringing signature, such that if said ringing signature is received, the one of the plurality of telephone numbers is verified, and wherein said ringing signature is a change in an impedance of the tested non-direct telephone line.

2. A method for verifying one of a plurality of telephone numbers of one of a plurality of called parties associated with a tested non-direct telephone line, the method comprising the steps of:

(a) connecting to the tested non-direct telephone line;

(b) dialing the one of the plurality of telephone numbers of the one of the plurality of called parties associated with the tested non-direct telephone line;

(c) analyzing a received signal received from the tested non-direct telephone line, wherein said received signal relates to a signal transmitted from a central office switch to the one of the plurality of called parties; and (d) if said received signal is a ringing type signal, verifying the one of the plurality of telephone numbers, wherein said ringing type signal is a ringing signature, such that if said ringing signature is received, the one of the plurality of telephone numbers is verified, and wherein said ringing signature is a change in a current of the tested non-direct telephone line.

3. A method for verifying one of a plurality of telephone numbers of one of a plurality of called parties associated with a tested non-direct telephone line, the method comprising the steps of:

(a) connecting to the tested non-direct telephone line;

(b) dialing the one of the plurality of telephone numbers of the one of the plurality of called parties associated with the tested non-direct telephone line;

(c) analyzing a received signal received from the tested non-direct telephone line, wherein said received signal relates to a signal transmitted from a central office switch to the one of the plurality of called parties; and (d) if said received signal is a ringing type signal, verifying the one of the plurality of telephone numbers, wherein said ringing type signal is a ringing signature, such that if said ringing signature is received, the one of the plurality of telephone numbers is verified, and wherein said ringing signature is a change in a voltage of the tested non-direct telephone line.

4. The method of claim 1, wherein the step of dialing the one of the plurality of telephone numbers of the one of the plurality of called parties associated with the tested non-direct telephone line is performed for substantially a ll of said plurality of telephone numbers.

5. The method of claim 2, wherein the step of dialing the one of the plurality of telephone numbers of the one of the plurality of called parties associated with the tested non-direct telephone line is performed for substantially all of said plurality of telephone numbers.

6. The method of claim 3, wherein the step of dialing the one of the plurality of telephone numbers of the one of the plurality of called parties associated with the tested non-direct telephone line is performed for substantially all of said plurality of telephone numbers.

* * * * *